United States Patent
Yamamura et al.

(10) Patent No.: US 10,080,326 B2
(45) Date of Patent: Sep. 25, 2018

(54) CONTROL APPARATUS FOR UTILITY VEHICLE THAT CONTROLS MOWING HEIGHT

(71) Applicant: Honda Motor Co., Ltd., Tokyo (JP)

(72) Inventors: Makoto Yamamura, Wako (JP); Toshiaki Kawakami, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 15/473,491

(22) Filed: Mar. 29, 2017

(65) Prior Publication Data
US 2017/0280623 A1 Oct. 5, 2017

(30) Foreign Application Priority Data
Mar. 31, 2016 (JP) ................................. 2016-071942

(51) Int. Cl.
| | |
|---|---|
| *A01D 34/00* | (2006.01) |
| *A01D 34/64* | (2006.01) |
| *A01D 34/74* | (2006.01) |
| *A01D 34/78* | (2006.01) |
| *A01D 69/02* | (2006.01) |
| *B60K 1/02* | (2006.01) |
| *B60K 7/00* | (2006.01) |
| *G01C 21/08* | (2006.01) |

(Continued)

(52) U.S. Cl.
CPC ............ *A01D 34/008* (2013.01); *A01D 34/64* (2013.01); *A01D 34/74* (2013.01); *A01D 34/78* (2013.01); *A01D 69/02* (2013.01); *B60K 1/02* (2013.01); *B60K 7/0007* (2013.01); *G01C 21/08* (2013.01); *G05D 1/0265* (2013.01); *A01D 2101/00* (2013.01); *B60K 2001/0416* (2013.01); *B60L 11/1818* (2013.01); *B60L 2200/40* (2013.01); *B60L 2210/30* (2013.01); *B60R 16/0207* (2013.01); *B60R 21/0136* (2013.01); *B60R 2021/01013* (2013.01)

(58) Field of Classification Search
CPC ....... A01D 34/008; A01D 34/64; A01D 34/74
See application file for complete search history.

(56) References Cited

U.S. PATENT DOCUMENTS

| | | | | |
|---|---|---|---|---|
| 4,376,298 A | * | 3/1983 | Sokol | ................... A01D 41/127 340/462 |
| 2013/0047565 A1 | | 2/2013 | Shida et al. | |

(Continued)

FOREIGN PATENT DOCUMENTS

| | | |
|---|---|---|
| EP | 1495661 A1 | 11/2006 |
| EP | 2425701 A2 | 3/2012 |

(Continued)

*Primary Examiner* — Adam M Alharbi
(74) *Attorney, Agent, or Firm* — Duft Bornsen & Fettig LLP

(57) ABSTRACT

In an apparatus for controlling operation of a utility vehicle that runs a working area to perform work by a work unit, there provided with a set mowing height inputting unit configured to input a mowing height of lawn mowing work set by a user, a desired mowing height setting unit configured to set a desired mowing height based on the set mowing height inputted by the set mowing height inputting unit, and a mowing height regulating unit configured to regulate height from ground surface of the work unit based on the desired mowing height set by the desired mowing height setting unit.

14 Claims, 9 Drawing Sheets

(51) Int. Cl.
*G05D 1/02* (2006.01)
*A01D 101/00* (2006.01)
*B60K 1/04* (2006.01)
*B60L 11/18* (2006.01)
*B60R 16/02* (2006.01)
*B60R 21/0136* (2006.01)
*B60R 21/01* (2006.01)

(56) References Cited

U.S. PATENT DOCUMENTS

| | | | |
|---|---|---|---|
| 2015/0296707 A1 | 10/2015 | Fukuda et al. | |
| 2015/0305239 A1* | 10/2015 | Jung | A01D 41/141 701/50 |

FOREIGN PATENT DOCUMENTS

| | | |
|---|---|---|
| JP | 2013017437 A | 1/2013 |
| JP | 2014103932 A | 6/2014 |
| JP | 2014128218 A | 7/2014 |
| WO | 2014007694 A1 | 1/2014 |
| WO | 2014007696 A1 | 1/2014 |
| WO | 2015040987 A1 | 3/2015 |

* cited by examiner

CONTROL APPARATUS FOR UTILITY VEHICLE THAT CONTROLS MOWING HEIGHT

CROSS-REFERENCE TO RELATED APPLICATIONS

This application is based upon and claims the benefit of priority from Japanese Patent Application No. 2016-071942 filed on Mar. 31, 2016, the contents of which are incorporated herein by reference.

BACKGROUND OF THE INVENTION

Field of the Invention

This invention relates to a control apparatus for a utility vehicle that runs within a working area to perform work with a work unit.

Description of Related Art

A prior art control apparatus for a utility vehicle of this type can be found, for example, in International Unexamined Patent Publication WO 2014/007694A1. The technology proposed in the reference relates to a utility vehicle equipped with a lawn mowing machine having a height-adjustable blade as a working unit.

The technical concept of the reference is to free the user from the inconvenience of having to manually adjust height of a lawn mowing work unit from the ground surface by enabling automatic height setting simply by inputting instructions through a display.

However, the disclosure of the reference is limited to this effect and suggests nothing about automatically raising and lowering set mowing height with consideration to lawn growth condition. The user therefore continues to be faced with the bother of dealing with required changes in work unit height.

SUMMARY OF THE INVENTION

Therefore, an object of this invention is to provide a control apparatus for a utility vehicle adapted to automatically vary height of a work unit and constantly maintain lawn grass at a set mowed height established by a user.

In order to achieve the object, this invention provides an apparatus and method for controlling operation of a utility vehicle that runs a working area to perform work by a work unit, there provided with a set mowing height inputting unit configured to input a mowing height of lawn mowing work set by a user, a desired mowing height setting unit configured to set a desired mowing height based on the set mowing height inputted by the set mowing height inputting unit, and a mowing height regulating unit configured to regulate height from ground surface of the work unit based on the desired mowing height set by the desired mowing height setting unit.

BRIEF DESCRIPTION OF THE DRAWINGS

The above and other objects and advantages will be more apparent from the following description and drawings, in which.

DETAILED DESCRIPTION OF THE INVENTION

A control apparatus for a utility vehicle according to an embodiment of this invention is explained with reference to the attached drawings in the following.

Figure 1:
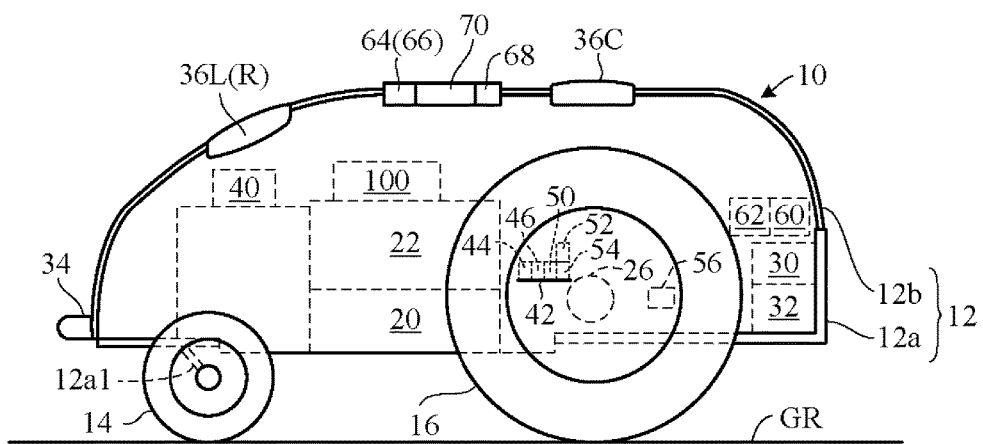
FIG. 1 is an overall schematic diagram showing a control apparatus for a utility vehicle according to an embodiment of this invention.
Figure 2:
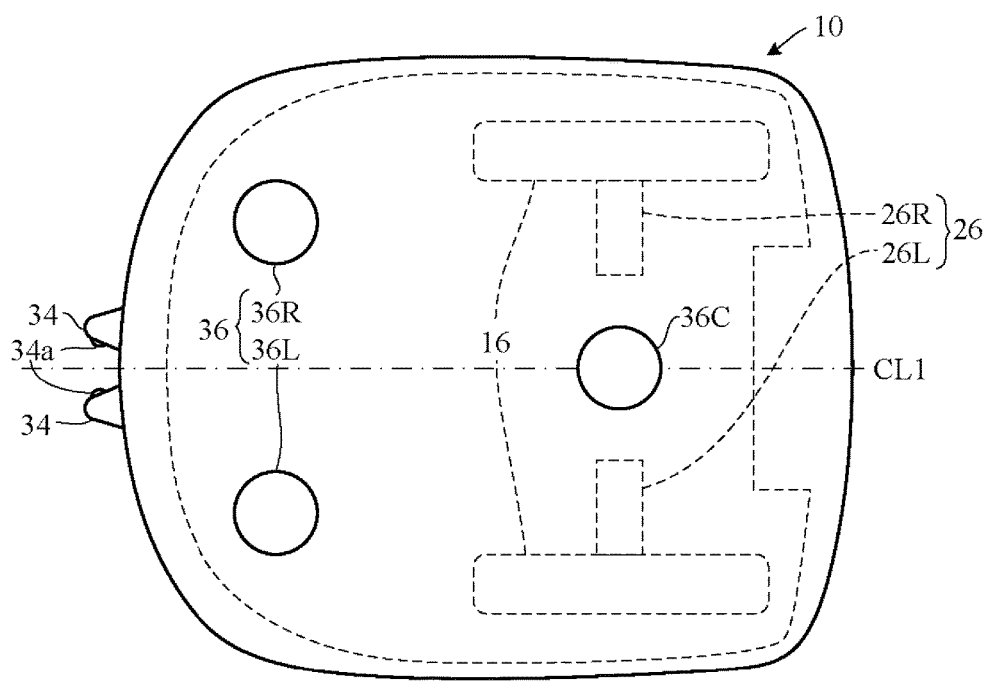
FIG. 2 is a plan view of the utility vehicle illustrated in FIG. 1.
Figure 3:
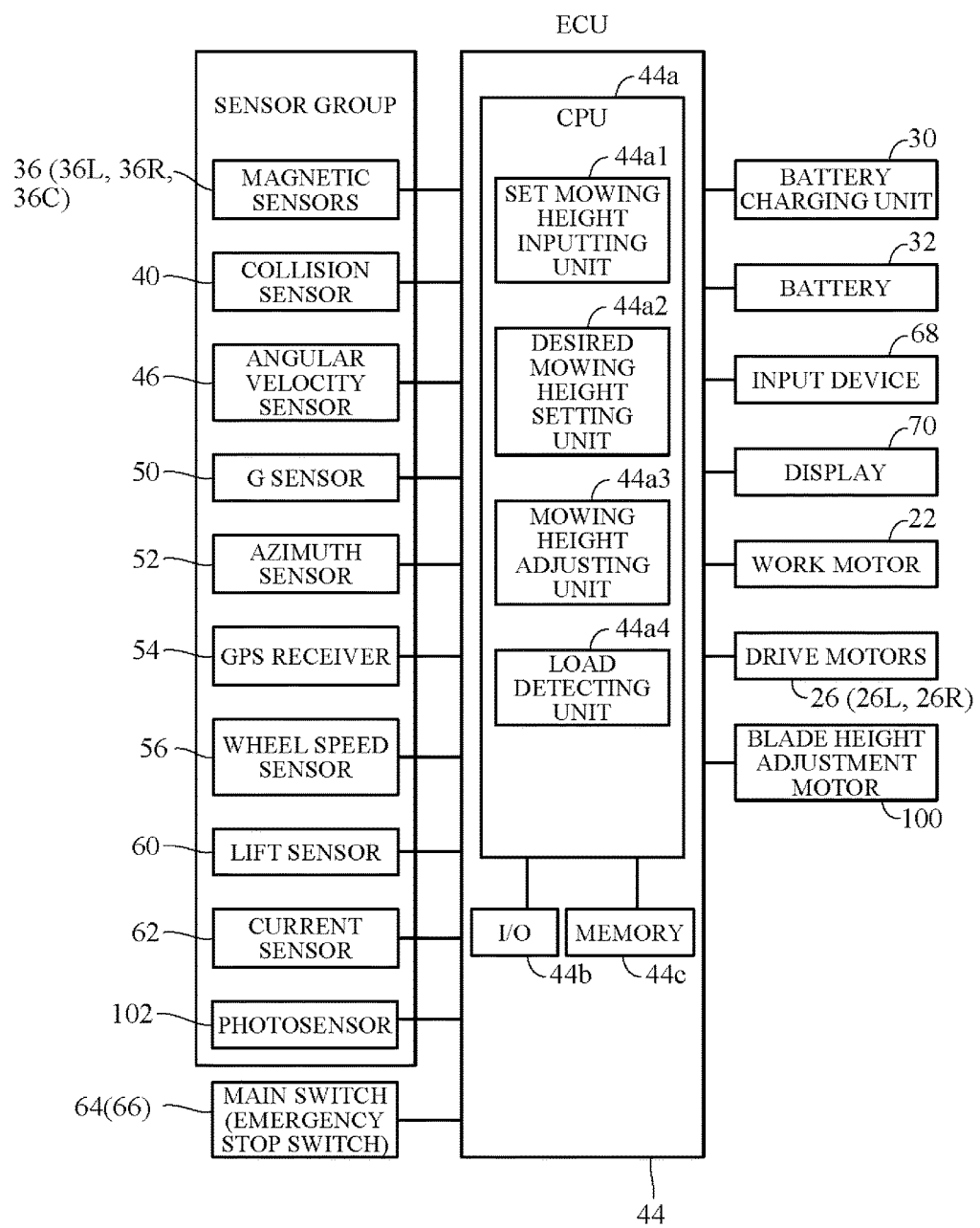
FIG. 3 is a block diagram showing inputs to an Electronic Control Unit installed in the utility vehicle illustrated in FIG. 1.

FIG. 1 is an overall schematic diagram showing a control apparatus for a utility vehicle according to an embodiment of this invention, FIG. 2 is a plan view schematically illustrating the configuration of the utility vehicle illustrated in FIG. 1; and FIG. 3 is a block diagram showing the configuration of the control apparatus of the utility vehicle according to the present embodiment including an Electronic Control Unit.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the user. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a center line CL running in the straight forward direction along the widthwise center of the vehicle 10. In addition, a third magnetic sensor 36C is installed on the center line CL1 at a location remote from the sensors 36L and 36R. The magnetic sensors 36 produces an output indicating magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the user or other worker. The vehicle 10 is equipped with a main switch 56 and an emergency stop switch 60 both operable by the user. A current sensor 62 is installed at input/output circuit of the battery 32 and produces an output indicating consumed current of the battery 32.

A main switch 64 for inputting various commands of the user, inter alia, start of operation, and an emergency stop switch 66 for inputting command for stopping the vehicle 10 in case of emergency are installed on the vehicle to be manipulatable by the user. The top of the frame 12b of the vehicle 10 has a large cutaway in which an input device 68 for inputting commands of the user and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b. An external device (e.g., smartphone) 100 operable by the user can be made connectable to the ECU 44 as indicated by imaginary lines in FIG. 3.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotate one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle $\theta$ in accordance with the speed difference. Conversely, when the rotational speed of the left rear wheel 16 is greater than the rotational speed of the right rear wheel 16, the vehicle 10 turns right at a turning angle $\theta$ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
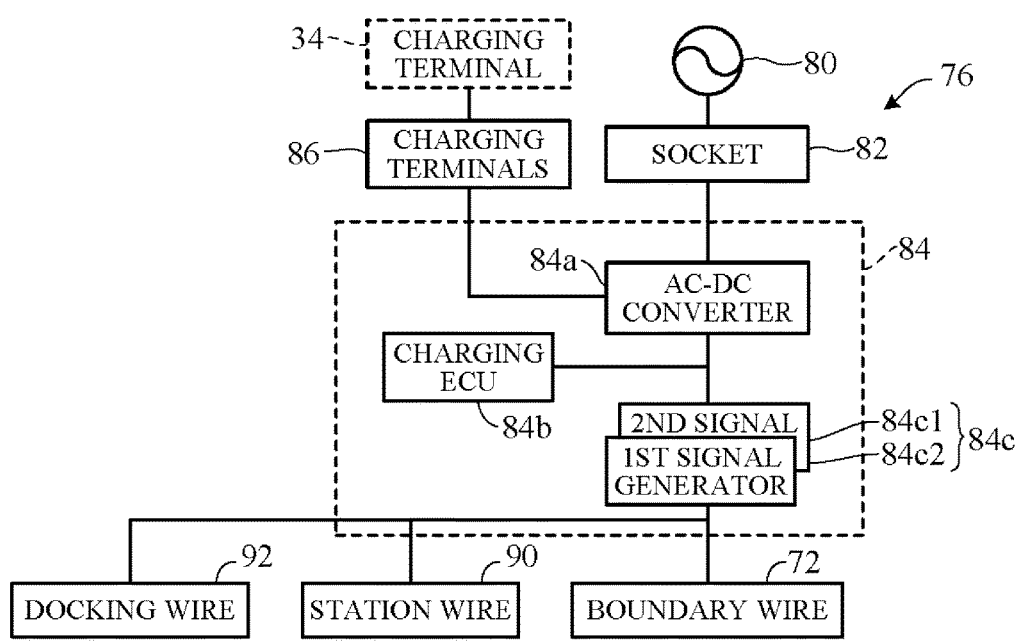
FIG. 5 is a block diagram showing configuration of a charging station of the utility vehicle shown in FIG. 4.

FIG. 5 is a block diagram showing electrical configuration of the charging station 76.

As shown in FIG. 5, the charging station 76 is equipped with a charger 84 connected through a socket 82 to a commercial power supply 80, and a pair of charging terminals 86 connected to the charger 84 and connectable to contact contacts 34a (shown in FIG. 2) of the pair of charging terminals 34 of the vehicle 10.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging contacts 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-DC converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signal in continuance sequence of pulse train and supply the generated area signal to the boundary wire 72, a station wire 90 for delineating the charging station 76a and a docking wire 92 for guiding the vehicle 10 to a charging position.

Figure 6:
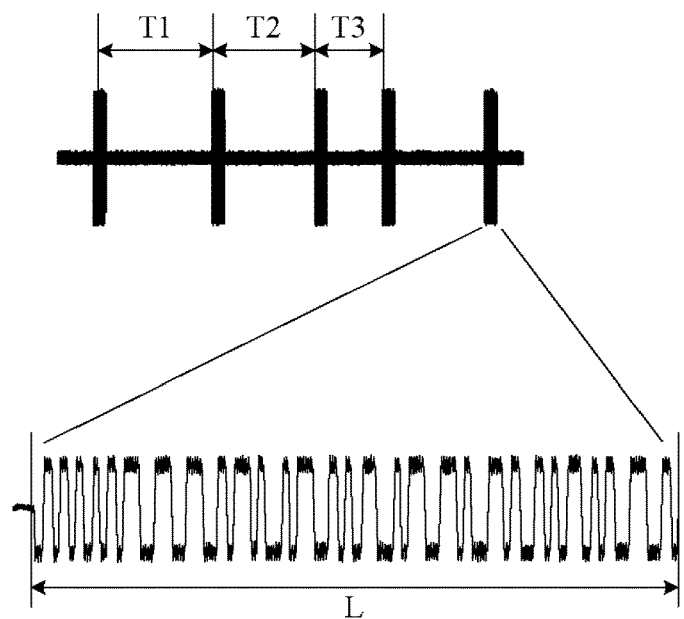
FIG. 6 is an explanatory diagram showing data signal of pulse train generated by a signal generator illustrated in FIG. 5.

FIG. 6 shows the area signal of pulse train generated by the first signal generator 84c1 to be passed through the boundary wire 72 that is corresponding to the binary data pulses sent from the charging ECU 84b. As shown, the area signal has a signal length L and is supplied to the boundary wire at random periods Tn. Although not shown, the second signal generator 84c2 generates similar data signal.

Figure 4:
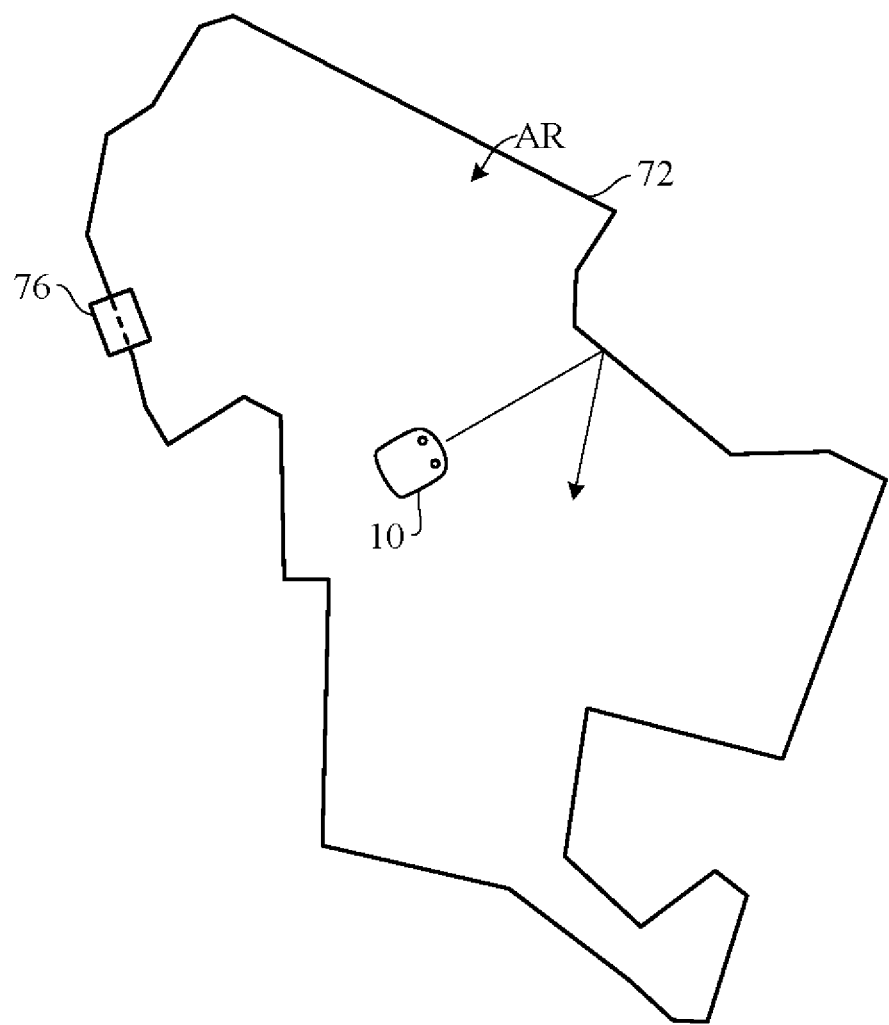
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
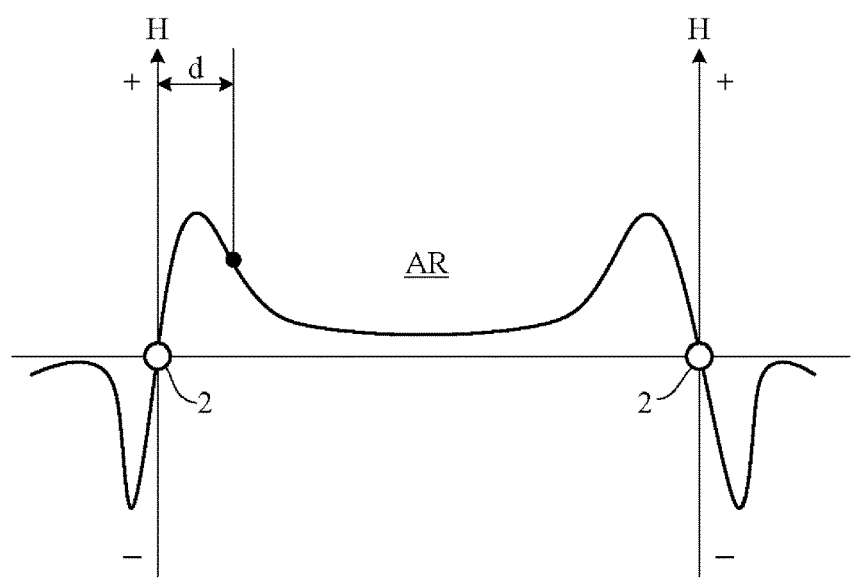
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR as will be later explained.

Figure 8:
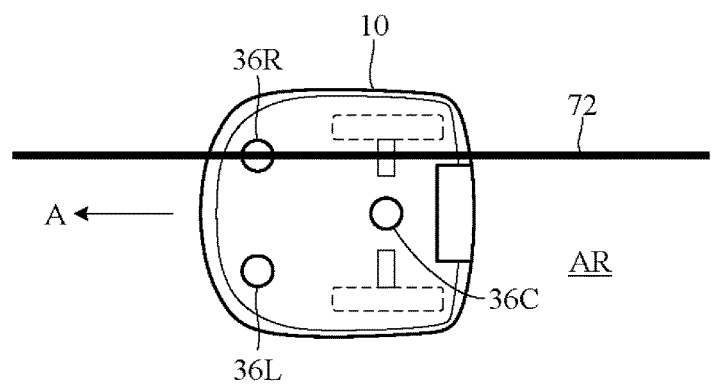
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Figure 9:
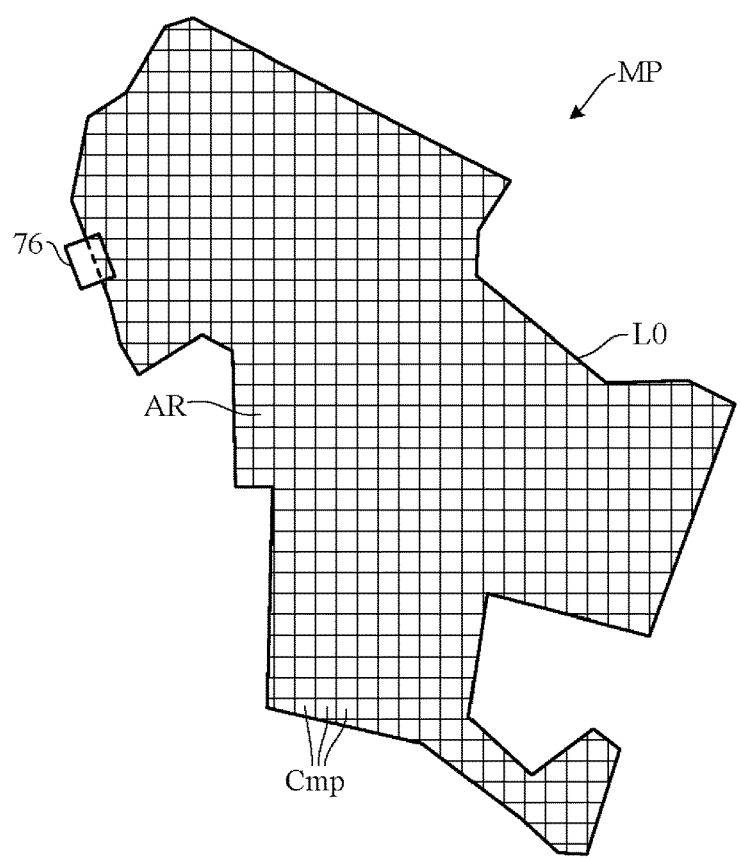
FIG. 9 is an explanatory diagram showing an example of a map of the working area illustrated in FIG. 4.

FIG. 9 is a diagram showing an example of the working area map MP. In the map MP, position of the boundary wire 72 is depicted as the boundary line (L0). More specifically, the map MP is configured by arraying the square cells Cmp in a grid pattern within a rectangular coordinate system plane including an X axis and a Y axis (XY plane) corresponding to inside of the working area AR. The plane is set with a reference orientation with respect to an origin corresponding to the position of the charging station 76. Each cell Cmp includes position data of X, Y coordinate. Size of the cells Cmp can be varied as appropriate and can, for example, be defined to coincide with working width of maximum outer diameter of blade 20.

Moreover, as shown in FIG. 1, the blade 20 is provided with a blade height adjustment motor 100 for vertically adjusting the height of the blade 20 from ground surface GR.

As shown in detail in FIG. 10, the blade height adjustment motor (hereinafter sometimes called "height adjustment motor") 100 is equipped with a drive gear 100a, a driven gear 100b meshed with the drive gear 100a, and a ratchet 110c for impeding over-rotation of the drive gear 100a, and the driven gear 100b is connected to the blade 20.

Therefore, when power is applied to drive the height adjustment motor 100, the blade 20 is moved vertically upward or downward to adjust its height from the ground surface GR. A photosensor 102 installed near the driven gear 100b produces an output indicating height of the blade 20 relative to the frame 12b and, indirectly, height of the blade 20 from the ground surface GR.

Figure 10:
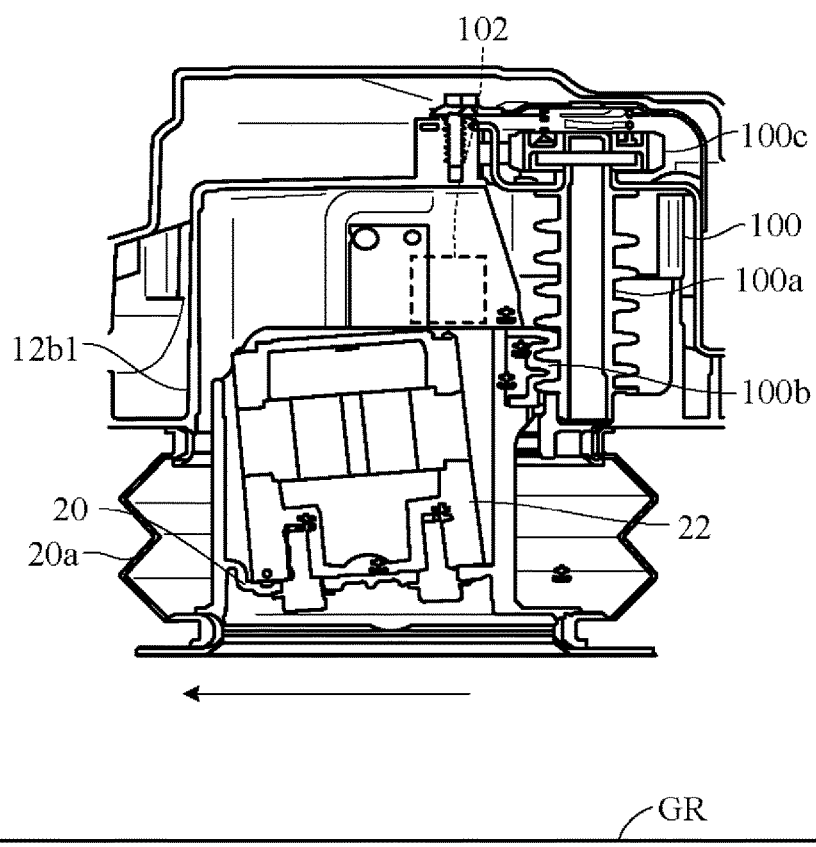
FIG. 10 is an explanatory diagram showing a blade height adjustment motor shown in FIG. 1.

In FIG. 10, reference symbol 12b1 indicates a bottom region of the frame 12b and symbol 20a indicates a hood of the blade 20. As illustrated, the blade 20 is attached to the frame 12b so as to descend forwardly toward the front (arrow direction) of the vehicle 10. The output of the photosensor 102 is sent to the ECU 44, and the ECU 44 adjusts the height of the blade 20 by controlling operation of the height adjustment motor 100 based on input value from the photosensor 102.

As the control apparatus for a utility vehicle according to this embodiment is characterized by the lawn mowing work of the vehicle 10, the explanation that follows is focused on this point.

Figure 11:
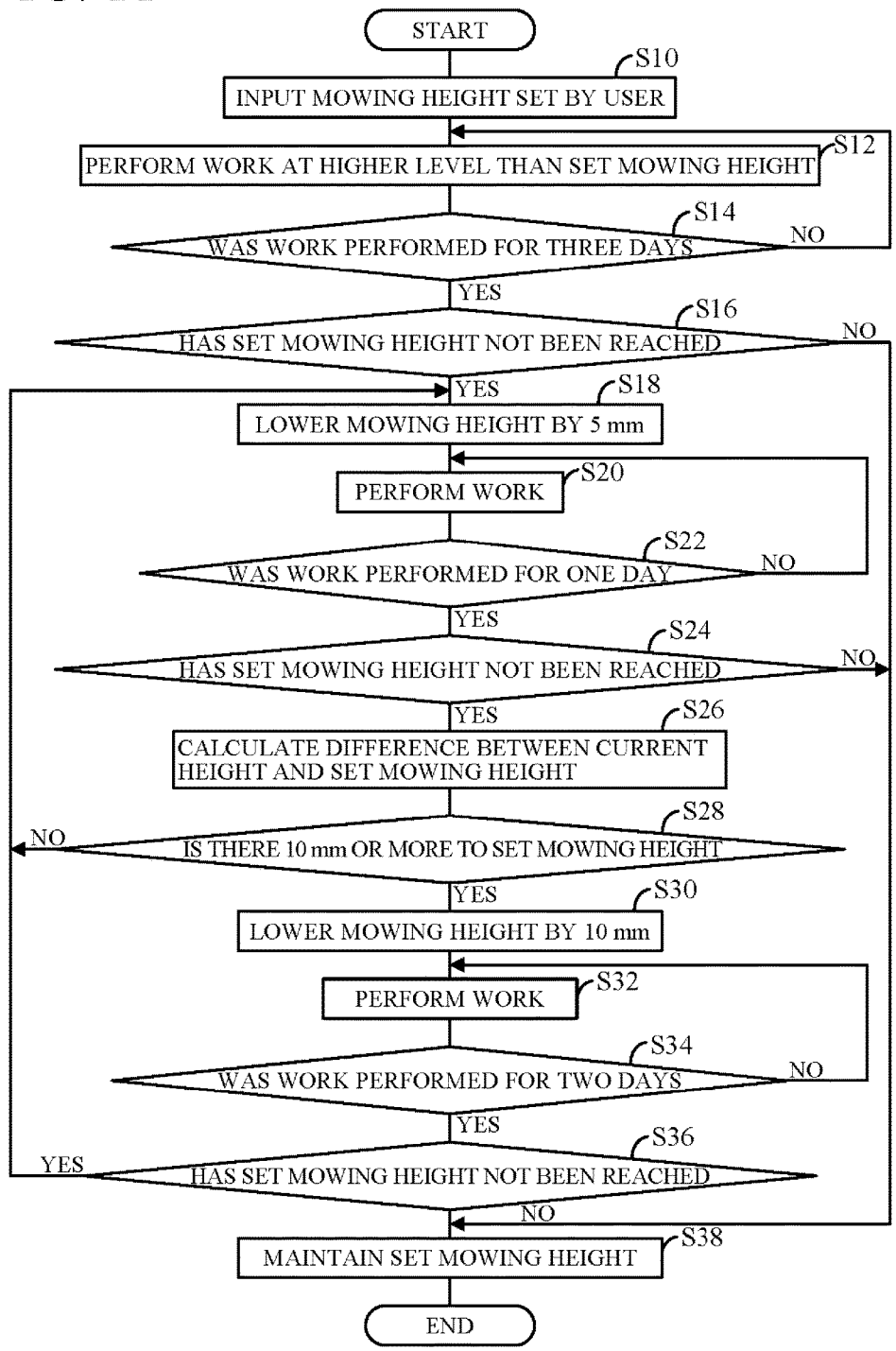
FIG. 11 is a flowchart showing operation of the control apparatus illustrated in FIG. 1.

FIG. 11 is a flowchart showing operations of the control apparatus for a utility vehicle.

The program shown is executed by the ECU 44. To be more exact, as seen in FIG. 3, the CPU 44a of the ECU 44 has a set mowing height inputting unit (or inputting means) 44a1, a desired mowing height setting unit (or setting means) 44a2, a mowing height regulating unit (or regulating means) 44a3 and a load detecting unit (or detecting means) 44a, and the processing shown in FIG. 10 is performed by the set mowing height input unit 44a1 and other units.

Now to explain, after execution of the illustrated program is commenced upon a user turning ON the main switch 64, first, in S10, a set mowing height of lawn mowing work (e.g., 30 mm) set or established by the user is inputted.

The user's set mowing height is inputted by the user operating the input device 68 in accordance with instructions shown on the display 70 in response to turn-on of the main switch. As the vehicle 10 is an autonomously navigating utility vehicle, most users ordinarily turn on the main switch 64 in spring of the year, for example, and leave it that way until turning it off when autumn or winter arrives.

Next, in S12, work is performed at the highest mowing height, namely, is carried out at a higher level (e.g., 60 mm) than the set mowing height inputted by the user (e.g., 30 mm). In other words, a desired mowing height of 60 mm, namely, one higher than the set mowing height, is set and height of the blade 20 from ground surface GR is also regulated to 60 mm.

The reasoning in this embodiment is to assume that the lawn in the working area AR grew to the higher level by the time the main switch 64 was first turned ON in spring. Specifically, a situation in which actual lawn height is 60 mm and inputted user's set mowing height is 30 mm is taken as a premise, and the lawn mowing work in such a situation is assumed to be that of working for 3 days, 1 day and 2 days, for example, while successively lowering height in steps of 5 mm, 10 mm or the like to complete lowering to the set mowing height in 12 days.

The lowering in small increments of 5 mm, for instance, is for cutting grass into fine pieces that immediately drop between and become buried among the individual lawn grass plants. In other words, it is to avoid cutting of large segments that become left to rot after dropping.

In the work of S12, lawn mowing at the high-level side 60 mm height is started from one corner of the working area AR, and the mowing of lawn is continued at this height while randomly running through the working area AR.

Next, in S14, it is determined whether work was performed for three days, and when the result is NO, the program returns to S12 to continue the aforesaid work. The repetition of the processing from S12 to S14 results in completion of three days' work as planned.

When the result in S14 becomes YES upon completion of three days' work, the program goes to S16 to determine whether the set mowing height established by the user has not yet been reached. In the first program loop, which starts from a height of 60 mm, this determination is of course YES, but if it should become NO after a number of program loops, the remaining processing steps are skipped.

When the result in S16 is YES, the program goes to S18, in which, as mentioned earlier, mowing height is lowered by 5 mm. In other words, the desired mowing height is set at 55 mm and height of the blade 20 from ground surface GR is also regulated to 55 mm. Next, in S20 and S22, one day's work is performed at the mowing height lowered by 5 mm.

Next, in S24, it is again determined whether the set mowing height has not yet been reached, and when the result is NO, the remaining processing steps are skipped, and when YES, the program goes to S26 difference between current height and the set value is calculated. So in the first program loop, the difference (25 mm) between the current desired mowing height (55 mm) and the set mowing height (30 mm) is calculated.

Next, in S28, it is determined whether there is still 10 mm or more to the set value (set mowing height), and when the result is NO, the program returns to S18.

On the other hand, when the result in S28 YES, the program goes to S30, in which the mowing height is lowered by 10 mm. In other words, the desired mowing height is set to 30 mm or thereabout and height of the blade 20 from ground surface GR is also regulated to 30 mm or thereabout. Next, in S32 and S34, two days' work is carried out at the mowing height lowered by 10 mm.

Next, in S36, it is again determined whether the set mowing height has not yet been reached, and when the result is YES, the program returns to S18 to repeat the foregoing processing. When the result in S36 is NO, the program goes to S38, in which the set mowing height is maintained. In other words, the desired mowing height is set to the set mowing height and the height of the blade 20 from the ground surface GR is also regulated to the set mowing height.

Figure 12:
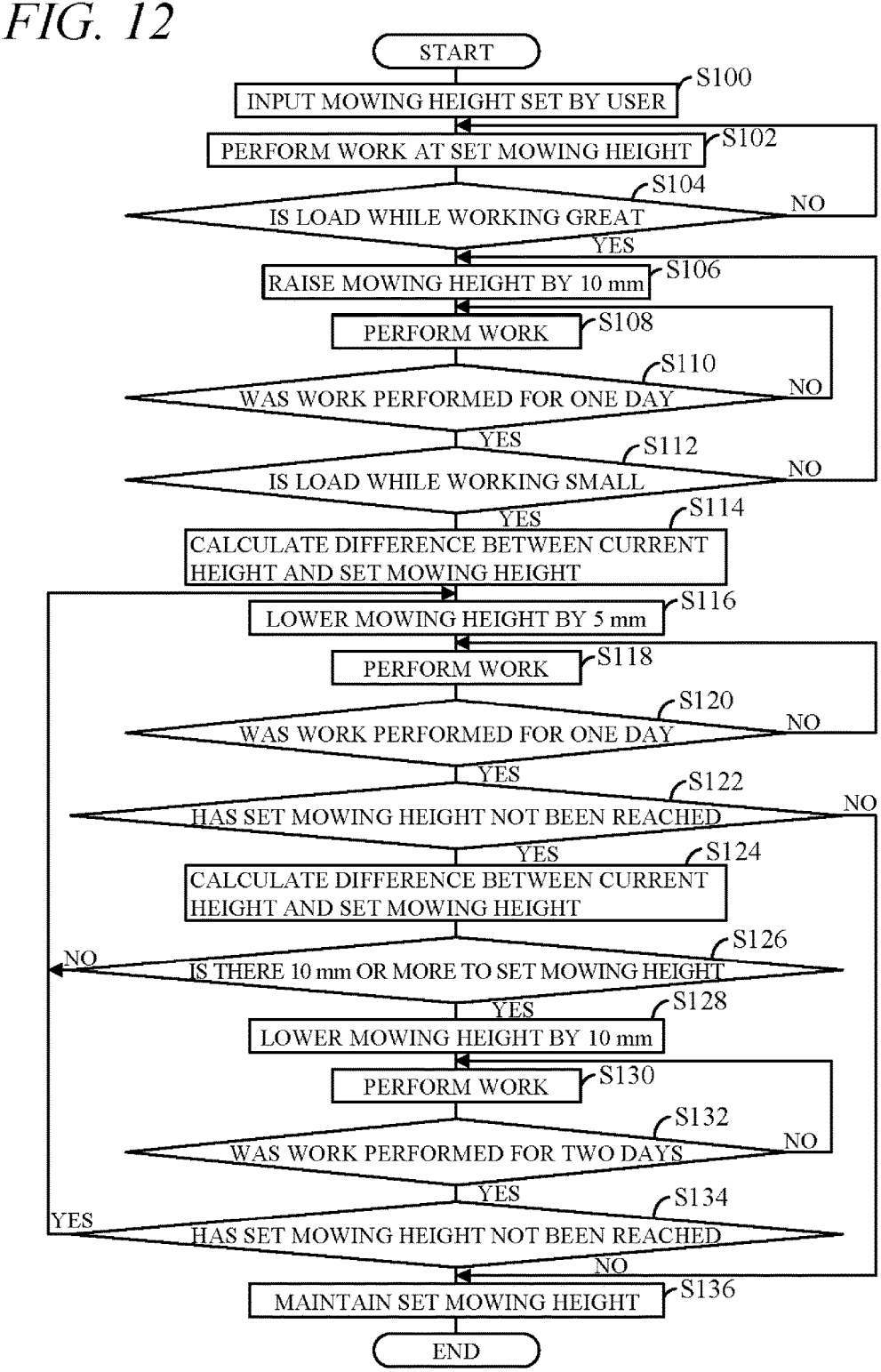
FIG. 12 is a flowchart showing another operation of the control apparatus illustrated in FIG. 1.

FIG. 12 is a flowchart showing another example of operations of this control apparatus for a utility vehicle.

The program according to this flowchart is premised on the same growth condition as that in FIG. 11 but in contrast to the case of FIG. 11 is further premised on a case of excessive local growth in the working area AR.

Now to explain, execution of the program shown here is also commenced upon a user turning ON the main switch 64, and first, in S100, a set mowing height of lawn mowing work established by the user is inputted.

Next, in S102, lawn mowing is performed at the set mowing height inputted by the user (30 mm) (i.e., the desired mowing height is set to 30 mm and the height of the blade 20 from the ground surface GR is also regulated to 30 mm), whereafter the program goes to S104 to determine whether load while working is great, namely, above a predetermined value.

As the work unit comprises the blade 20 and the work motor 22 constituted of an electric motor, this determination is performed by comparing current consumption of the work motor 22 detected by the current sensor 62 with an appropriately defined predetermined value and determining whether it is equal to or greater than the predetermined value. The set predetermined value is derived from an experimentally obtained value or from an average value of current consumption over a predetermined period, for example, the year earlier period.

When the result in S104 is NO, the program returns to S102, and when YES, goes to S106 to raise mowing height by 10 mm. Namely, the desired mowing height is set to 40 mm and height of the blade 20 from the ground surface GR is also regulated to 40 mm.

Mowing height is raised here because lawn in the part of the working area at hand is presumed to have grown more than an expected value. Next, in S108 and S110, one day's work is performed at the mowing height raised by 5 mm.

Next, in S112, it is determined whether load while working is small, namely, less than the aforesaid predetermined value.

When the result in S112 is NO, the program returns to S106, and when YES, goes to S114 to calculate difference between current height and the set value. So in the first program loop, the difference (10 mm) between the current desired mowing height (40 mm) and the set mowing height (30 mm) is calculated.

Next, in S116, mowing height is lowered by 5 mm. In other words, the desired mowing height is set to 35 mm and height of the blade 20 from ground surface GR is also regulated to 35 mm. Next, in S118 and S120, one day's work is carried out at the mowing height lowered by 5 mm.

Next, in S122, it is determined whether the set mowing height set by the user has not yet been reached, and when the result is NO the remaining processing steps are skipped, and when YES, the program goes to S124 to calculate difference between current height and the set value.

Next, in S126, it is determined whether there is still 10 mm or greater to the set value (set mowing height), and when the result is NO, the program returns to S116, and when YES, goes to S128, in which the mowing height is lowered by 10 mm.

In other words, the desired mowing height is set to 30 mm or thereabout and height of the blade 20 from ground surface GR is also regulated to 30 mm or thereabout. Next, in S130 and S132, two days' work is carried out at the mowing height lowered by 10 mm.

Next, in S134, it is again determined whether the set mowing height has not yet been reached, and when the result is YES, the program returns to S116 to repeat the foregoing processing, and when NO, the program goes to S136, in which the set mowing height is maintained. In other words, the desired mowing height is set to the set mowing height and the height of the blade 20 from the ground surface GR is regulated to the set mowing height.

As stated above, the embodiment of this invention provides an apparatus and method for controlling operation of a utility vehicle (10) that runs a working area (AR) to perform work by a work unit (blade 20, work motor 22), characterized by: an electronic control unit (ECU 44) having a microprocessor (44a) and a memory (44c), wherein the microprocessor is configured to function as: a set mowing height inputting unit (44a1, S10, S100) configured to input a mowing height of lawn mowing work set by a user; a desired mowing height setting unit (44a2, S12, S102, S106, S116, S128) configured to set a desired mowing height based on the set mowing height inputted by the set mowing height inputting unit; and a mowing height regulating unit (44a3, S18, S30, S106, S116, S128) configured to regulate height from ground surface of the work unit based on the desired mowing height set by the desired mowing height setting unit.

With this, it becomes possible to vary the work unit height automatically to constantly maintain the set mowing height set by the user and free the user from bother. In the apparatus and method, the desired mowing height setting unit adjusts the desired mowing height by a predetermined amount based on the set mowing height inputted by the set mowing height inputting unit.

With this, it becomes possible to vary the work unit height more accurately to constantly maintain the set mowing height set by the user and free the user from bother.

The apparatus and method further include: a load detecting unit (44a1 (44), S104, S122) configured to detect load of the work unit (20); and the desired mowing height setting unit adjusts the desired mowing height based on the load of the work unit detected by the load detecting unit (S106, S116).

With this, it becomes possible to vary the work unit height more accurately to constantly maintain the set mowing height set by the user and free the user from bother.

In the apparatus and method, the desired mowing height setting unit adjusts the desired mowing height in such a manner that the desired mowing height is raised when the detected load of the work unit is equal to greater than a predetermined value, while the desired mowing height is lowered when the detected load of the work unit is less than the predetermined value (S106, S116).

With this, it becomes possible to vary the work unit height more accurately to constantly maintain the set mowing height set by the user and free the user from bother. In addition, it becomes possible to mitigate load of the work unit (to decrease consumption of the onboard battery 32) by raising the desired mowing height when the load is great, thereby enabling to elongate work time.

In the apparatus and method, the predetermined value is an average value of the load of the work unit during a prescribed period.

With this, in addition to the effects and advantages mentioned above, it becomes possible to detect load of the work unit more precisely.

The apparatus and method further include: a switch (main switch 64); and the set mowing height inputting unit inputs the mowing height of lawn mowing work when the switch is turned on (S10, S100).

With this, in addition to the effects and advantages mentioned above, it becomes possible to further lighten burden of the user.

In the apparatus and method, the work unit includes a mower blade (20) whose height from ground surface (GR) is made adjustable.

With this, it becomes possible to vary the work unit height of lawn mower m more easily.

In the above, it should be noted that although the mowing height is adjusted in stages such as 5 mm or 10 mm, they are examples and should not be limited thereto.

It should further be noted that although the lawn mowing work is performed for 3, 1 and 2 days, they are examples and should not be limited thereto.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of a utility vehicle that runs a working area to perform work by a work unit, comprising:
    an electronic control unit having a microprocessor and a memory,
    wherein the microprocessor is configured to function as:
        a set mowing height inputting unit configured to input a mowing height of lawn mowing work set by a user;
        a desired mowing height setting unit configured to set a desired mowing height at a higher level than the set mowing height based on the set mowing height inputted by the set mowing height inputting unit; and
        a mowing height regulating unit configured to regulate a height from a ground surface of the work unit based on the desired mowing height set by the desired mowing height setting unit, wherein
        the desired mowing height setting unit is configured to lower the desired mowing height by a predetermined amount when the desired mowing height has not reached the set mowing height, and to further lower the desired mowing height by a specified amount that is larger than the predetermined amount when the desired mowing height has not reached the set mowing height after lowering the desired mowing height by the predetermined amount.

2. An apparatus for controlling operation of a utility vehicle that runs a working area to perform work by a work unit, comprising:
    a load detecting unit configured to detect load of the work unit; and
    an electronic control unit having a microprocessor and a memory;
    wherein the microprocessor is configured to function as:
        a set mowing height inputting unit configured to input a mowing height of lawn mowing work set by a user;
        a desired mowing height setting unit configured to set a desired mowing height in such a manner that the desired mowing height is raised when the detected load of the work unit is equal to or greater than a predetermined value, and the desired mowing height is lowered by a predetermined amount when the load of the work unit detected by the load detecting unit is less than the predetermined value; and
        a mowing height regulating unit configured to regulate a height from a ground surface of the work unit based on the desired mowing height set by the desired mowing height setting unit, wherein
        the desired mowing height setting unit is configured to lower the desired mowing height by a specified amount that is larger than the predetermined amount if a difference between the desired mowing height and current height is larger than the specified amount when the desired mowing height has not reached the set mowing height after lowering the desired mowing height by the predetermined amount.

3. The apparatus according to claim 2, wherein the predetermined value is an average value of the load of the work unit during a prescribed period.

4. The apparatus according to claim 1, further including:
    a switch;
    wherein the set mowing height inputting unit is configured to input the mowing height of lawn mowing work when the switch is turned on.

5. The apparatus according to claim 1, wherein the work unit includes a mower blade whose height from ground surface is made adjustable.

6. A method for controlling operation of a utility vehicle that runs a working area to perform work by a work unit, comprising the steps of:
    inputting a mowing height of lawn mowing work set by a user;
    setting a desired mowing height at a higher level than the set mowing height inputted by the user; and
    regulating a height from a ground surface of the work unit based on the desired mowing height set by the step of desired mowing height setting, wherein
    the setting step further includes lowering the desired mowing height by a predetermined amount when the desired mowing height has not reached the set mowing height, and further includes lowering the desired mowing height by a specified amount that is larger than the predetermined amount if a difference between the desired mowing height and current height is larger than the specified amount when the desired mowing height has not reached the set mowing height after lowering the desired mowing height by the predetermined amount.

7. A method for controlling operation of a utility vehicle that runs a working area to perform work by a work unit, comprising the steps of:
    inputting a mowing height of lawn mowing work set by a user;
    detecting load of the work unit;
    setting a desired mowing height based on the set mowing height inputted by the user in such a manner that the desired mowing height is raised when the detected load of the work unit is equal to or greater than a predetermined value, and the desired mowing height is lowered by a predetermined amount when the detected load of the work unit is less than the predetermined value; and
    regulating a height from a ground surface of the work unit based on the desired mowing height set by the step of desired mowing height setting, wherein
    the setting step further includes lowering the desired mowing height by a specified amount that is larger than the predetermined amount if a difference between the desired mowing height and current height is larger than the specified amount when the desired mowing height has not reached the set mowing height after lowering the desired mowing height by the predetermined amount.

8. The method according to claim 7, wherein the predetermined value is an average value of the load of the work unit during a prescribed period.

9. The method according to claim 6, wherein the step of inputting the mowing height comprises inputting the mowing height of lawn mowing work when a switch is turned on.

10. The method according to claim 6, wherein the work unit includes a mower blade whose height from ground surface is made adjustable.

11. The method according to claim 7, wherein the step of inputting the mowing height comprises inputting the mowing height of lawn mowing work when a switch is turned on.

12. The method according to claim 7, wherein the work unit includes a mower blade whose height from ground surface is made adjustable.

13. The apparatus according to claim 2, further including:
a switch;
 wherein the set mowing height inputting unit inputs the mowing height of lawn mowing work when the switch is turned on.

14. The apparatus according to claim 2, wherein the work unit includes a mower blade whose height from ground surface is made adjustable.

\* \* \* \* \*